United States Patent [19]
Storck et al.

[11] 4,230,948
[45] Oct. 28, 1980

[54] ARRANGEMENT FOR THE PRODUCTION OF X-RAY SECTIONAL PICTURES

[75] Inventors: Eckhard Storck; Ulrich Wolff, both of Munich, Fed. Rep. of Germany

[73] Assignee: Siemens Aktiengesellschaft, Berlin & Munich, Fed. Rep. of Germany

[21] Appl. No.: 944,364

[22] Filed: Sep. 21, 1978

[30] Foreign Application Priority Data

Sep. 28, 1977 [DE] Fed. Rep. of Germany ....... 2743678

[51] Int. Cl.³ ............................................. G03B 41/16
[52] U.S. Cl. ................................................. 250/445 T
[58] Field of Search .................................... 250/445 T

[56] References Cited
PUBLICATIONS

"Spatial Filtering to Improve Transverse Tomography", Peters, IEEE Transactions on Medical Engineering, vol. BME-21, No. 3, May, 1974, pp. 214-219.

*Primary Examiner*—Craig E. Church
*Attorney, Agent, or Firm*—Hill, Van Santen, Steadman, Chiara & Simpson

[57] ABSTRACT

The aim of the present disclosure is to provide an arrangement for the production of x-ray sectional pictures by means of which the layergram can be filtered in a rapid and simple manner. The recording medium possesses a modulation transmission function having high-pass or band-pass filter characteristics.

5 Claims, 1 Drawing Figure

U.S. Patent  Oct. 28, 1980  4,230,948
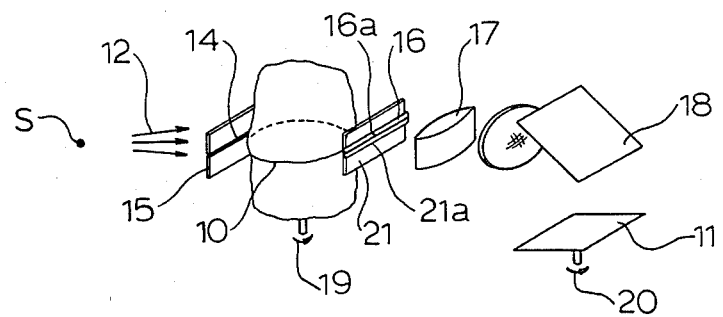

ARRANGEMENT FOR THE PRODUCTION OF X-RAY SECTIONAL PICTURES

BACKGROUND OF THE INVENTION

The present invention relates to an arrangement for the production of x-ray sectional pictures, comprising an x-ray source for the production of x-rays which penetrate the object in at least one sectional plane, an x-ray screen which serves to convert penetrated x-rays into radiation to which a provided recording medium is sensitive, a focusing optics by means of which each point of the screen is portrayed in the form of a line on the recording medium, where points located beside one another are portrayed as lines located beside one another, and a rotation device by means of which the object and the x-ray source with the screen may be rotated relative to one another about an axis of rotation which is at right angles to the sectional plane.

Arrangements for the production of x-ray sectional pictures of the type referred to in the introduction are known (Peters, T. M.: Spatial Filtering to Improve Transverse Tomography, IEEE Transactions BME-21, No. 3, May 1974, pages 214–219). In this arrangement the x-ray source consists of a conventional x-ray tube and a slotted diaphragm composed of lead. The lead absorbs the oncoming x-rays so that the latter can only emerge from the slot and thus possess an areal distribution. These x-rays irradiate an object, for example a human body, and the x-rays which have penetrated through are fed to an x-ray screen by which they are converted into radiation to which a provided recording medium is sensitive, for example ultraviolet light (UV-light) or visible light. Due to the areal distribution of the x-rays only a narrow layer, a so-called sectional plane, of the object is x-rayed and therefore only a narrow strip running parallel to the sectional plane is recorded on the screen. This strip is focused onto a photo-plate via a focusing optics. This focusing optics has the property of portraying a point on the excited strip of the screen in the form of a line onto the photo-plate, and points lying beside one another are portrayed as lines lying beside one another. Here points lying beside one another are those which do not lie on a straight line running at right angles to the excited strip in the image plane. The focusing optics which carries out this function consists, in the known arrangement, of a cylindrical lens and a spherical lens, both of which are arranged in the beam path between the screen and the photo-plate. In accordance with the quoted publication, in order to achieve a fan beam geometry, the cylindrical lens must be replaced by a conical lens.

Arrangements of this type are preferably used in x-ray diagnosis, in which the associated processes for the production of x-ray sectional pictures are known under the name "Transaxial tomography". These processes facilitate the representation of the density distribution in a sectional plane through the object—the patient—without the covering and overlapping of adjacent parts which are unavoidable in conventional processes.

The sectional picture itself is obtained from the projection data formed when the relevant cross sectional plane is irradiated in various directions. A first step consists in the back-projection and superimposition of the projection data. Here a so-called layergram or Heckmann image is formed which is a representation of the desired density distribution smeared with the function 1/r. Here smearing is to be understood in that an ideal point is not reproduced as an ideal point but as a spot. The intensity distribution of this spot is described by the so-called point spread function (psf). Smearing with the function 1/r is to be understood in that the psf decreases from the center outwards with the function 1/r.

The desired density distribution is obtained from the "layergram" in that the 1/r smearing is cancelled. This is carried out by means of a special local frequency filtering which is known under the slogan "rho filtering". This "rho filtering" is characterized by a modulation transmission function which, plotted over the spatial frequency from 0, possesses an ascent which is to be linear as far as possible. For the "rho filtering", the developed image of the layergram is processed either analog-optically or digital-electronically (see above quoted publication). This step of the filtering of the layergram is time consuming and technically elaborate however.

SUMMARY OF THE INVENTION

Therefore, the aim of the present invention is to provide an arrangement of the type referred to in the introduction with which the layergram can be filtered rapidly and easily.

This aim is realized by a recording medium which possesses a modulation transmission function having high-pass or band-pass filter characteristics.

BRIEF DESCRIPTION OF THE DRAWING

The single FIGURE shows an exemplary overall arrangement for the production of x-ray pictures but characterized by the use of an electrophotographic recording medium as explained hereinafter.

DETAILED DESCRIPTION

A preferred arrangement is characterized by electrophotographic recording medium (An exemplary overall arrangement for the production of x-ray pictures is shown, for example, in the single FIGURE of drawings herein which corresponds to part (b) of the first figure at page 214 of the aforementioned article in BME-21, No. 3, May 1974.)

In a conventional transverse tomographic system such as shown in part (a) of the first Figure at page 214 of the aforementioned article in BME-21, number 3, May 1974, in order to image a particular section, both the film and the object are rotated synchronously for the duration of the x-ray exposure. Shadows of points in a single plane of the object are steadily projected onto the same place on the film during the rotation, whereas shadows of other parts of the object move in relation to the film. Thus, while the section of interest is imaged sharply, the picture is overlayed by the motion-blurred images of other parts of the object. As described in said article, in the apparatus such as shown on the drawing, instead of imaging the section in the conventional manner, the angle of the incident radiation is such that only rays passing through the desired cross section 10 are incident upon the recording medium located at 11. The x-ray beam indicated at 12 is apertured by a narrow slit 14 in a lead plate 15 so that the rays only impinge upon the single section 10 of the object. The one-dimensional radiographic projection of this section is registered on a photofluorographic screen 16 so that the equivalent optical presentation of the projection is obtained. To get a result similar to that in the conventional apparatus with the angle of incident radiation at zero, the luminescent line on the screen 16 as indicated at 16a must be spread out in a direction perpendicular to its length prior to being imaged on the record medium 11. This is effected by focusing this line 16a onto the record medium 11 with an optical system, one element of which is a cylindrical lens 17. To avoid any unwanted x-ray exposure of the record medium, a mirror 18 reflects the optical information through a right angle while any x-radiation passes through the mirror 18 and bypasses the record medium 11.

To obtain an image of a particular section, the object and record medium are rotated synchronously as indicated by arrows 19 and 20, as is the case with the conventional system. After an appropriate exposure, an image is formed on the record medium 11 by the integration of all of the projections of the object, which have been spread by the lens 17 in the manner described. Such an image produced in this manner may be termed a "layergram" of the section 10. In the illustrated apparatus, a lead plate 21 is located behind the fluorescent screen 16 and is provided with a slit aperture 21a for transmitting the luminescent line 16a on the screen 16. The incident radiation 12 would of course be supplied by an x-ray source such as indicated at S in correspondence with the conventional transverse tomographic system shown in the aforementioned article.

The outstanding advantage of the invention consists in that recording and filtering of the layergram constitute one single process so that the previous time consuming and technically elaborate filtering step can be entirely omitted. This considerable advantage is achieved by an only slight modification of a conventional arrangement.

It is unnecessary for the modulation transmission function (MTF) to possess the theoretically required proportionality to the local frequency. For example in the event that $$\text{MTF (or MÜF)} \sim \rho^\alpha, \alpha > 1 \tag{1}$$

one obtains a detail accentuation known under the term "harmonization" in x-ray diagnosis (see publications: Gebauer A., Lissner J., Schott O. "Das Rontgenfernsehen", Georg Thieme Verlag, Stuttgart, 1974 page 167 ff and Schaffert R. M. "Electrophotography" Focal Press, 1975, page 195). The spatial frequency range in which equation (1) is to be effective is governed by the size and spatial resolution of the cross section which is to be reconstructed. If, for example, a number of 200×200 points is to be resolved on an area of 100×100 mm², equation (1) is only required to apply for up to a maximum of two lines per millimeter.

Recording processes whose modulation transmission (MTF) is of the type given by equation (1) are known in electrophotography. Latent, electrostatic images are visualized and the low spatial frequencies are suppressed ("edge effect", see R. M. Schaffert "Electrophotography" Focal Press, 1975, pages 34–35). There are a series of possibilities of visualizing the electrostatic images (see R. M. Schaffert "Electrophotography" Focal Press 1975, pages 33–48). In most processes dyes, so-called "toners", are used. Here the suppression of the low spatial frequencies lies in the nature of the electrostatic field and can be controlled by a development electrode (see R. M. Schaffert "Electrophotography" Focal Press, 1975, pages 494–505). Also in toner-free development processes, for example employing thermoplastics, there is generally a suppression of the low local frequencies (see R. M. Schaffert "Electrophotography", Focal Press, 1975, pages 44–46, 150–165 and E. Storck, U. Wolff "Theorie der thermoplastischen Bilddarstellung" Siemens Forschungs und Entwicklungsbericht, 1977, Vol. 2, pages 63–68).

Thus, electrophotographic recording materials can be used with preference for simultaneous recording and filtering.

A recording medium with a modulation transmission function (MTF) as a function of spatial frequency, which when plotted over the spatial frequency range from zero lines per millimeter up to the maximum spatial frequency (governed by the size and spatial resolutions of the cross section to be reconstructed as herein explained), exhibits a relative suppression of the modulation transmission function (MTF) values at low spatial frequencies at least to an extent as in a modulation transmission function which is proportional to spatial frequency, is herein termed a recording medium with a modulation transmission function having a high-pass or band-pass filter characteristic. Referring to equation (1), a modulation transmission function having a high-pass characteristic is one having a value of alpha ($\alpha$) not substantially less than one.

It will be apparent that many modifications and variations may be effected without departing from the scope of the novel concepts and teachings of the present invention.

We claim as our invention:

1. An arrangement for the production of x-ray pictures, comprising an x-ray source for the production of x-rays which penetrate the object in at least one sectional plane, an x-ray screen which serves to convert the x-rays which have penetrated through into radiation to which a given recording medium is sensitive, a focusing optics by means of which each point of the screen is portrayed in the form of a line onto the recording medium, where points located beside one another are portrayed as lines located beside one another, and a rotation device by means of which the object and the x-ray source with the screen can be rotated relative to one another about an axis of rotation which is at right angles to the sectional plane, characterized by a recording medium which possesses a modulation transmission function having high-pass or band-pass filter characteristics.

2. An arrangement as claimed in claim 1, characterized by an electrophotographic recording medium.

3. The method of producing x-ray pictures which comprises directing x-ray energy so as to penetrate an object in at least one sectional plane, converting the x-ray energy which has penetrated through the object into radiation to which a given recording medium is sensitive, focussing the image of the screen such that each point of the screen is portrayed in the form of a line on the recording medium and relatively rotating the object so as to direct the x-ray energy through the object from a multiplicity of different directions while recording the resultant radiation for each of such multiplicity of projections by means of such recording medium, wherein the improvement comprises recording such radiation for each such projection by means of a recording process which exhibits a modulation transmission function which when plotted as a function of spatial frequency from zero lines per millimeter to N lines per millimeter exhibits a rising characteristic as function of increasing spatial frequency so as to provide for a relative supression of modulation transmission function values at spatial frequencies relatively near to zero lines per millimeter and to provide a relative enhancement of modulation transmission function values near N lines per millimeter where the number N is governed by the size and spatial resolution of the cross sectional area of the object which is to be recorded.

4. A method according to claim 3 characterized in recording the resultant radiation from each such projection by means of an electrophotographic recording process wherein the rising characteristic corresponds to values of modulation transmission function (MTF) for each value of the spatial frequency between zero and N which values are proportional to the relevant value of spatial frequency raised to the alpha power where the value of alpha is not substantially less than one.

5. A method according to claim 4, where the value of alpha is greater than one.

* * * * *